United States Patent Office 3,224,501
Patented Dec. 21, 1965

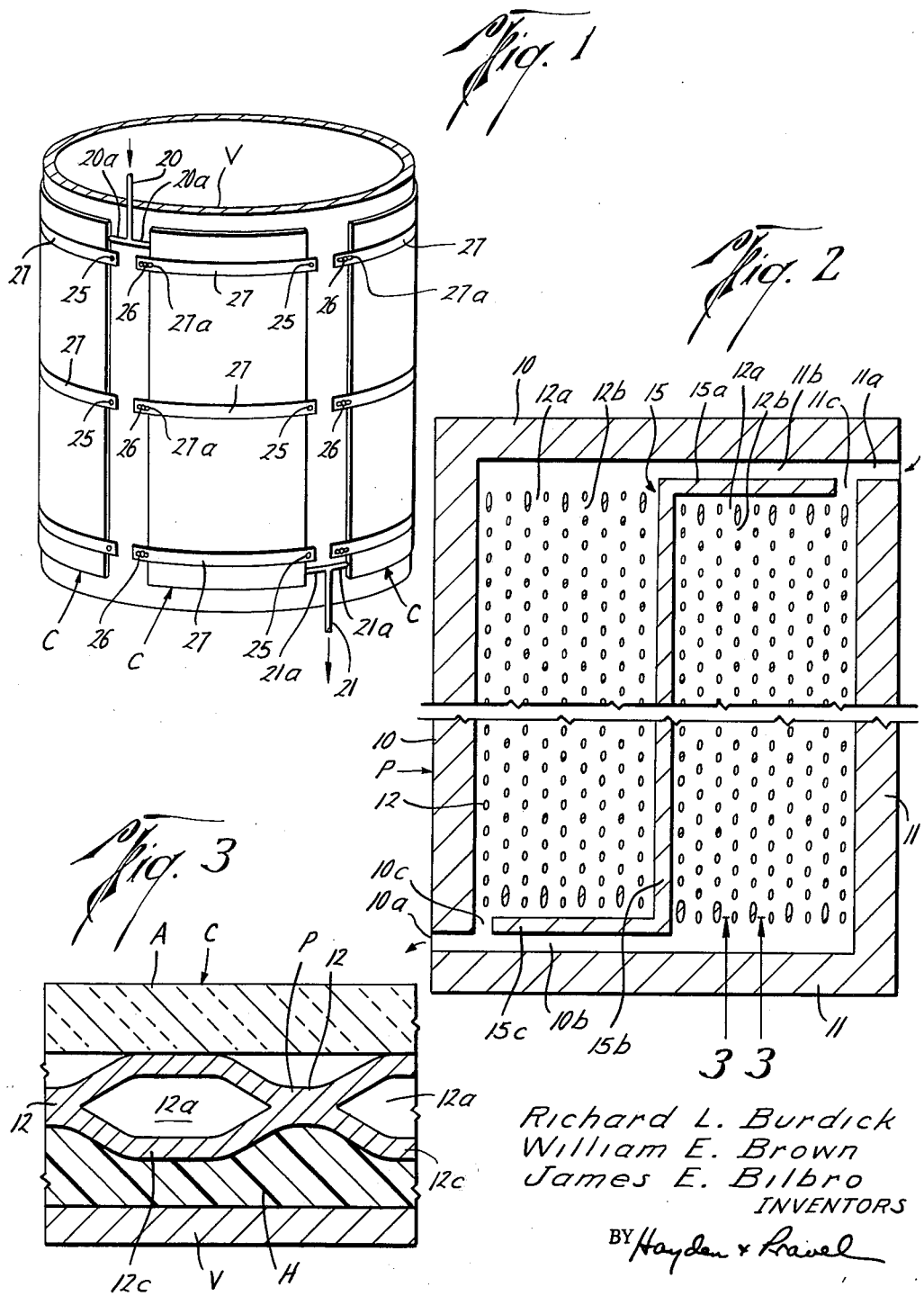
Dec. 21, 1965   R. L. BURDICK ETAL   3,224,501
HEAT TRANSFER CEMENT AND PANEL CONSTRUCTIONS
Filed March 28, 1962
Richard L. Burdick
William E. Brown
James E. Bilbro
INVENTORS
BY Hayden & Pravel
ATTORNEYS

3,224,501
HEAT TRANSFER CEMENT AND PANEL
CONSTRUCTIONS
Richard L. Burdick, William E. Brown, and James E. Bilbro, all of Houston, Tex., assignors, by mesne assignments, to Thermon Manufacturing Company, Houston, Tex., a corporation of Texas
Filed Mar. 28, 1962, Ser. No. 183,228
6 Claims. (Cl. 165—81)

This invention relates to a new and improved heat transfer cement and panel construction adapted to transfer heat to or from an object.

Some forms of heat transfer panels have been employed in the past for transferring heat to process storage vessel, bulk transportation equipment and other units wherein it was desired to increase, decrease, or maintain temperatures in such units. Such heat transfer panels have normally been formed of such materials and thicknesses that the panels expanded and contracted at a different rate from the vessels or other units on which they have been mounted. Therefore, particularly when such panels are mounted in a curved shape or a cylindrical vessel, the expansion of the panels has resulted in air gaps between the panels and the vessel. Since air is an insulator rather than a heat transfer material, the effectiveness of the heat transfer between the panels and the vessel has been seriously reduced.

In an effort to fill such air gaps, heat transfer cements have been employed between the heat transfer panels and the vessels, but prior to the present invention, such efforts have been unsuccessful.

An object of the present invention is to provide a new and improved heat transfer cement, and a new and improved heat transfer cement and panel construction which provides for a constant, or substantially constant, heat transfer rate therethrough when in use on a vessel or the like, even though expansion and contraction of such plate takes place.

An important object of this invention is to provide a new and improved heat transfer cement and panel construction, wherein the heat transfer cement has a greater coefficient of thermal expansion than the panel so that upon a heating of the panel and a consequent expansion thereof, the cement expands to a greater extent than the panel to preclude the creation of air gaps or spaces between the panel and the vessel on which it is mounted.

Another object of this invention is to provide a new and improved heat transfer cement and panel construction wherein the heat transfer cement is non-hardening so as to conform to changes in shape of the panel due to changes in the temperature thereof.

A further object of this invention is to provide a new and improved heat transfer cement and panel construction wherein the panel has a plurality of spaced projections in contact with the cement to increase the surface tension action between the panel and the cement for thereby inhibiting a separation of the panel from the cement during temperature changes of the panel.

Still another object of this invention is to provide a new and improved heat transfer cement and panel construction in which the panel is formed of relatively thin sheets of a metal such as copper having flow passages therethrough for flowing steam, hot water, hot glycol or other heating fluid in order to transfer heat from the panel through the heat transfer cement to a vessel or the like on which said construction is mounted, or for flowing cooling agents such as brine, water, Freon, butane, propane, and ethylene glycol therethrough for removing heat from such vessel or the like.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view illustrating a vertical sectional portion of a tank or vessel to which have been applied the heat transfer cement and panel construction of this invention;

FIG. 2 is a horizontal sectional view of one of the heat transfer panels illustrated in FIG. 1; and FIG. 3 is a cross-sectional view taken on line 3—3 of FIG. 2 to illustrate further details of the heat transfer cement and panel construction of this invention.

In the drawings, the letter V designates a portion of a vessel, tank, pipe or other similar object on which the heat transfer cement and panel construction C of this invention is adapted to be mounted. Briefly, the construction C of this invention includes a heat transfer panel P which is mounted on the vessel V or other object with a layer of heat transfer cement H therebetween (FIG. 3). Preferably, an outer layer of insulation A is also included with the construction C as shown in FIG. 3. With the construction C of this invention, heat may be transferred from the panel P through the cement H and the wall of the vessel V to the interior of such vessel V, or alternatively, heat may be conducted away from any material or liquid within the vessel V by a fluid flowing in the panel P. When heat is being transferred from the panel P to the vessel V or other object, the fluid flowing in the panel P will be a heating fluid, whereas when the heat is to be removed from the vessel V, the fluid flowing in the panel P is a cooling fluid, as will be more fully explained.

The panel P is preferably made of copper or other heat conducting metal or material which may be curved or otherwise shaped to fit the contour of the vessel V or other object to which it is attached. In the present form of the panel P as illustrated in the drawings, the panel is formed of two sheets of copper which are bonded or welded at the edge areas 10 and 11, and also at spaced spot areas 12. Additionally, the sheets are welded or otherwise bonded along a separator section 15 having legs 15a, 15b and 15c. The edge sealed portions 10 and 11 are provided with channels or openings 10a and 11a which serve as the fluid flow channels. As illustrated in FIGS. 1 and 2, the channel 11a is an inlet channel for the heating or cooling fluid and the channel or opening 10a is for the discharge of such fluid. The leg 15a of the separator strip 15 is spaced from the upper edge 10 to provide a channel 11b which is a continuation of the opening or channel 11a and which causes the fluid to flow to the left side of the panel P as viewed in FIG. 2. The end of the leg 15a is spaced from the edge 11 to provide another channel 11c which permits the fluid to enter the righthand side of the panel P. Thus, the fluid entering the panel P through the opening 11a is directed to both the right and the lefthand side of the panel P. The central leg 15b of the separator strip 15 keeps the fluid on the two sides separate from each other as it flows and provides a more efficient flow pattern for the fluid. The arrangement of the sealed spot areas 12 provides for fluid longitudinal fluid channels 12a which are in fluid communication with the lateral channels 12b so that the fluid flows in a zig-zag pattern of movement and disperses throughout the panel P as it moves from the inlet opening 11a to the outlet opening 10a.

The leg 15c of the separator 15 is spaced from the lower edge 11 to provide a channel 10b which is a continuation of the opening 10a and establishes communication with the righthand side of the panel P for the discharge of the fluid from such portion. The leg 15c is also separated from the left edge portion 10 to provide a channel 10c which communicates with the outlet opening 10a to discharge the fluid from the lefthand side of the panel P. It will be understood that the form of the panel P described above is the preferred form for use in connection with this invention because of its efficiency in heat transfer, but the invention is not limited to such specific construction since the panel may be formed in various ways and of other heat conducting materials. For example, the fluid channels for dispersing the fluid throughout the panel P may be moulded, pressed or otherwise formed, and the material used may be steel, copper or alloys.

As illustrated in FIG. 1, the heating or cooling fluid is admitted into the panels P through an inlet tube 20 which is connected with any suitable source of the heating or cooling fluid. The lower "T" section of the fluid line 20 has portions 20a directly connected to opening 11a for two adjacent panels P. Thus, a single line 20 normally supplies two of the panels P and, of course, the inlet opening 11a on one of the panels P is on the lefthand side whereas the opening 11a for the other panel is on the righthand side to connect up with the tube portions 20a.

The outlet or discharge from the panels P is similarly connected to an outlet tube 21 which has tube portions 21a connecting in with two adjacent panels P for the discharge of the heating or cooling fluid.

Normally, the heating fluids which are introduced through the line 20 are steam, hot water and hot glycol, although any suitable heating fluid may be used. Suitable cooling fluids include brine, water, Freon, butane, propane and ethylene glycol, although other cooling materials will be suitable.

As shown in FIG. 1, the panel P and also the insulation A, if used, is removably held in place on the exterior of the vessel V in a shape conforming generally to the curvature of the portion of the vessel to which it is attached. In some instances, the heat transfer cement H is applied at the factory to the panel P and therefore the panel P is applied to the vessel V with the heat transfer material H therebetween and with the insulation A forming the outer layer of the construction C. If, however, the heat transfer cement H is not applied prior to the insulation of the construction C, the heat transfer cement H is initially applied to the vessel V and then the panel P is placed thereon so as to embed the projections 12c formed by the channel 12a and the channel 12b into the heat transfer cement H as shown in FIG. 3. The insulation layer A may then be applied if it is to be used. Preferably, threaded studs 25 and 26 are welded to the external surface of the vessel V so that each of the panels P fits within the row of threaded studs 25 on the right and the row of threaded studs 26 on the left. Band metal straps 27, each of which has an opening on one end for the threaded stud 25 and a slot 27a on the other end for the threaded stud 26, are positioned for holding the construction C in position, with or without the insulation layer A. The longitudinal slots 27a provide for the expansion and contraction of the construction C due to temperature changes. Other means for attaching the construction C may of course be utilized.

When the insulation layer A is used as a part of the construction C, it is formed of any commercial insulation material such as fiberglass, cork or calcium silicate. Under most operating conditions, the insulation layer A will increase the efficiency of the heat transfer to or from the panel P.

Since the panel P is formed of a metal such as copper, it will expand and contract with temperature changes. Also, since the panel P is generally at a higher temperature than the wall of the vessel V or other object to which it is applied, the rate of expansion of the panel P is generally greater than that of the vessel V. In the prior art constructions, such difference in the rate of expansion and contraction of the panel P with respect to the vessel V has resulted in air gaps or voids between the panel P and the vessel V. With the present invention, the heat transfer material or cement H has a coefficient of expansion which is greater than the coefficient of expansion of the panel P so that the material H remains in sealing contact with the inner surface of the panel P and the exterior surface of the vessel V, thus eliminating any air gaps between the panel P and the vessel V. The heat transfer material H is also preferably non-hardening so that it remains pliable and expansible during the temperature changes.

In the preferred form of the invention, the heat transfer cement H includes a heat conducting agent and an organic binder. The material H also preferably has a dispersing and gelling agent and an oxidation inhibitor.

The heat conducting agent may be any material having a high thermal conductivity, and in particular, it may be a metal in powdered, granular or other particulate form, a metal oxide or other metallic compound, graphite or any form of divided carbon. It will also be understood that a mixture of one or more of such agents may be employed.

The organic binder used in the cement H of this invention may be polybutene, a silicone, a butyl rubber, or an uncatalyzed epoxy resin, as well as other organic binders which together with the heat conducting agent provide a greater coefficient of expansion than the metal of the panel P.

The oxidation inhibitor may be 4,4'-methylenebis (2,6 di-tert-butylphenol), hydroquinone, or any other similar stabilizer or oxidation inhibitor.

The dispersing and gelling agent is preferably pyrogenic colloidal silica, which is sold under the trade name "Cab-o-sil."

It has been found that the following percentage ranges by weight provide a heat transfer cement H having a thermal coefficient of expansion which is greater than copper, steel and other materials suitable for the panel P:

| | Percent |
|---|---|
| Organic binder | 40–60 |
| Oxidation inhibitor | .04–.60 |
| Dispersing and gelling agent | 1.5–2.5 |
| Heat conducting agent | balance to 100 |

More specifically, when polybutene is the organic binder, the inhibitor, 4,4' methylenebis (2,6 di-tert-butylphenol) is used within the range of about .4–.6% by weight, and preferably .47% by weight. If hydroquinone is used as the oxidation inhibitor with polybutene, the hydroquinone is used in a percentage from about .04–.06%, and specifically .05%.

With the present invention, an economical, easy to handle, heat transfer construction is provided which eliminates the undesirable air gaps heretofore found between the heat transfer panels and the vessels or other objects on which they have been mounted. Additionally, the projections 12c extend into the heat transfer cement H to give a greater surface tension effect and an increased holding power to further prevent separation of the panel P from the cement H during repeated expansion and contraction of the panel P due to temperature changes.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. In combination with a vessel,

(a) a prefabricated heat transfer panel having passage means therethrough for conducting a heat transfer fluid,
(b) means mounting said panel on the vessel for effecting a heat transfer between the panel and the vessel, and
(c) heat transfer cement disposed between and in complete contact with said panel and said vessel,
(d) said heat transfer cement including particles of a stable high thermal conductivity heat conducting agent dispersed in an organic binder which cement is non-hardening and pliable and has a greater coefficient of thermal expansion than said panel to maintain said complete contact with both said panel and said vessel even during the expansion and contraction of the panel relative to the wall of the vessel.

2. In combination with a vessel,
(a) a prefebricated heat transfer panel having passage means therethrough for conducting a heat transfer fluid,
(b) means mounting said panel on the vessel for effecting a heat transfer between the panel and the vessel, and
(c) heat transfer cement disposed between and in contact with said panel and said vessel,
(d) said heat transfer cement having a greater coefficient of thermal expansion than said panel, and including particles of a stable high thermal conductivity heat conducting agent dispersed in an organic binder with an oxidation inhibitor and a silica dispersing and gelling agent.

3. In combination with a vessel,
(a) a prefabricated heat transfer panel having passage means therethrough for conducting a heat transfer fluid,
(b) means mounting said panel on the vessel for effecting a heat transfer between the panel and the vessel, and
(c) heat transfer cement disposed between and in complete contact with said panel and said vessel,
(d) said heat transfer cement having a greater coefficient of thermal expansion than said panel, and including about 40–60% by weight of an organic binder, about .04–.60% by weight of an oxidation inhibitor, about 1.5–2.5% by weight of a silica dispersing and gelling agent, and the balance substantially all of particles of a stable high thermal conductivity heat conducting agent.

4. In combination with a vessel,
(a) a prefabricated heat transfer panel having passage means therethrough for conducting a heat transfer fluid,
(b) means mounting said panel on the vessel for effecting a heat transfer between the panel and the vessel, and
(c) heat transfer cement disposed between and in contact with said panel and said vessel,
(d) said heat transfer cement having a greater coefficient of thermal expansion than said panel, and including about 40–60% by weight of polybutene, about .4–.6% by weight of 4,4' methylenebis (2.6 di-tert butylphenol), about 1.5–2.5% by weight of pyrogenic colloidal silica, and the balance substantially all of particles of a stable high thermal conductivity heat conducting agent.

5. In combination with a vessel,
(a) a prefabricated heat transfer panel having passage means therethrough for conducting a heat transfer fluid,
(b) means mounting said panel on the vessel for effecting a heat transfer between the panel and the vessel, and
(c) heat transfer cement disposed between and in contact with said panel and said vessel,
(d) said heat transfer cement having a greater coefficient of thermal expansion than said panel, and including about 40–60% by weight of an organic binder selected from the group consisting of polybutene, silicones, butyl rubbers, and uncatalyzed epoxy resins, about .04–.60% by weight of an oxidation inhbitor, about 1.5–2.5% by weight of a silica dispersing and gelling agent, and the balance substantially all of particles of a stable high thermal conductivity heat conducting agent selected from the group consisting of metals, metallic compounds, graphite, and divided carbon.

6. In combination with a vessel,
(a) a heat transfer panel having passage means therethrough for conducting a heat transfer fluid,
(b) means mounting said panel on the vessel for effecting a heat transfer between the panel and the vessel, and
(c) heat transfer cement disposed between and in contact with said panel and said vessel,
(d) said heat transfer cement having a greater coefficient of thermal expansion than said panel, and including about 40–60% by weight of polybutene, about .04–.06% by weight of hydroquinone, about 1.5–2.5% by weight of pyrogenic colloidal silica, and the balance substantially all of particles of a stable high thermal conductivity heat conducting agent.

References Cited by the Examiner

UNITED STATES PATENTS

| 1,796,123 | 3/1931 | Samesreuther et al. | 165—169 X |
| 2,748,104 | 5/1956 | Viohl | 260—41 |
| 2,881,096 | 4/1959 | Kisbany | 260—41.5 |
| 2,896,135 | 7/1959 | Briggs | 260—375 |
| 2,999,831 | 9/1961 | Stewart | 260—41.5 |

FOREIGN PATENTS

| 465,981 | 6/1950 | Canada. |
| 289,924 | 4/1928 | Great Britain. |

ROBERT A. O'LEARY, *Primary Examiner.*

CHARLES SUKALO, *Examiner.*